(12) United States Patent
Kuriyama et al.

(10) Patent No.: US 9,321,580 B2
(45) Date of Patent: Apr. 26, 2016

(54) INTERNAL POUCH HELD IN A DOUBLE-STRUCTURED AEROSOL CAN

(75) Inventors: Kouji Kuriyama, Yokohama (JP); Shinji Tanaka, Yokohama (JP); Madoka Yamaguchi, Yokohama (JP); Takuo Shibata, Shinagawa-ku (JP)

(73) Assignees: TOYO SEIKAN GROUP HOLDINGS, LTD., Tokyo (JP); TOYO AEROSOL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/239,422

(22) PCT Filed: Aug. 22, 2012

(86) PCT No.: PCT/JP2012/071144
§ 371 (c)(1),
(2), (4) Date: Feb. 18, 2014

(87) PCT Pub. No.: WO2013/153686
PCT Pub. Date: Oct. 17, 2013

(65) Prior Publication Data
US 2014/0209632 A1    Jul. 31, 2014

(30) Foreign Application Priority Data
Apr. 12, 2012  (JP) .................. 2012-091285

(51) Int. Cl.
*B65D 35/22*    (2006.01)
*B65D 83/62*    (2006.01)
(Continued)

(52) U.S. Cl.
CPC ............... *B65D 83/62* (2013.01); *A45D 19/02* (2013.01); *A45D 34/00* (2013.01); *B32B 7/12* (2013.01);
(Continued)

(58) Field of Classification Search
USPC ............... 222/94, 95, 96; 383/109, 116, 119
See application file for complete search history.

(56) References Cited

U.S. PATENT DOCUMENTS

| 4,423,829 A * | 1/1984 | Katz .............................. 222/95 |
| 6,218,017 B1 * | 4/2001 | Yamashita et al. ......... 428/424.2 |

(Continued)

FOREIGN PATENT DOCUMENTS

| JP | 08-104357 A |   | 4/1996 |
| JP | 08104357 A | * | 4/1996 |

(Continued)

OTHER PUBLICATIONS

English Translation, JP 2005231644, Machine Generated, Feb. 2015.*

(Continued)

*Primary Examiner* — Paul R Durand
*Assistant Examiner* — Benjamin R Shaw
(74) *Attorney, Agent, or Firm* — Sughrue Mion, PLLC

(57) ABSTRACT

An internal pouch held in a double-structured aerosol can, composed of first and second internal pouches for containing first and second agents, respectively, the aerosol can being capable of simultaneously ejecting the first and second agents. The first internal pouch has a layer constitution that includes a polyolefin inner layer, an adhesive resin layer on the inner layer side, an aluminum foil, an adhesive resin layer on the outer layer side and a thermoplastic resin outer layer; the second internal pouch has a layer constitution that includes a polyolefin inner layer, an adhesive resin layer on the inner layer side, an aluminum foil, an adhesive resin layer on the outer layer side and a thermoplastic resin outer layer; and the adhesive resin forming the adhesive resin layer on the inner layer side of the first internal pouch contains a polyether type urethane resin.

4 Claims, 3 Drawing Sheets

(51) Int. Cl.

| | | |
|---|---|---|
| *A45D 19/02* | (2006.01) | |
| *A45D 34/00* | (2006.01) | |
| *B32B 7/12* | (2006.01) | |
| *B65D 83/68* | (2006.01) | |
| *B32B 15/085* | (2006.01) | |
| *B32B 15/088* | (2006.01) | |
| *B32B 15/09* | (2006.01) | |
| *B32B 15/20* | (2006.01) | |
| *B65D 83/32* | (2006.01) | |

(52) U.S. Cl.
CPC ........... *B32B 15/085* (2013.01); *B32B 15/088* (2013.01); *B32B 15/09* (2013.01); *B32B 15/20* (2013.01); *B65D 83/682* (2013.01); *A45D 2019/025* (2013.01); *A45D 2200/057* (2013.01); *A45D 2200/058* (2013.01); *B32B 2307/558* (2013.01); *B32B 2307/714* (2013.01); *B32B 2439/02* (2013.01); *B32B 2439/40* (2013.01); *B65D 83/32* (2013.01)

(56) References Cited

U.S. PATENT DOCUMENTS

| | | | |
|---|---|---|---|
| 7,036,685 B1* | 5/2006 | Green | 222/94 |
| 7,285,334 B1* | 10/2007 | Yamashita et al. | 428/458 |
| 7,798,366 B2* | 9/2010 | Hoshino | 222/136 |
| 2004/0104135 A1 | 6/2004 | Kaneko et al. | |
| 2006/0163282 A1* | 7/2006 | Suzuki | 222/135 |
| 2006/0240246 A1* | 10/2006 | Fukuda et al. | 428/328 |
| 2008/0101734 A1* | 5/2008 | Chen et al. | 383/109 |
| 2008/0118647 A1* | 5/2008 | Suzuki et al. | 427/362 |
| 2013/0161349 A1 | 6/2013 | Pfeiffenberger | |
| 2013/0244088 A1* | 9/2013 | Minamibori et al. | 429/175 |
| 2014/0075895 A1* | 3/2014 | O'Connor | 53/469 |

FOREIGN PATENT DOCUMENTS

| | | | |
|---|---|---|---|
| JP | 11-138697 A | | 5/1999 |
| JP | 11-198950 A | | 7/1999 |
| JP | 11198950 A | * | 7/1999 |
| JP | 2002-274578 A | | 9/2002 |
| JP | 2002274578 A | * | 9/2002 |
| JP | 2005-231644 A | | 9/2005 |
| JP | 2005231644 A | * | 9/2005 |
| JP | 4332444 B2 | | 9/2009 |
| WO | 2012017047 A1 | | 2/2012 |
| WO | WO2012017047 | * | 2/2012 |
| WO | WO20120017047 | * | 2/2012 |

OTHER PUBLICATIONS

English Translation, JP 11198950, Machine Generated, Feb. 2015.*
English Translation, JP 08104357, Machine Generated, Feb. 2015.*
English Translation, JP 2002274578, Machine Generated, Feb. 2015.*
English Translation, WO 2012017047, Machine Generated, Feb. 2015.*
Communication dated Nov. 14, 2014, issued by the European Patent Office in counterpart Application No. 12874229.3.
International Search Report for PCT/JP2012/071144 dated Dec. 11, 2012.

* cited by examiner

INTERNAL POUCH HELD IN A DOUBLE-STRUCTURED AEROSOL CAN

CROSS REFERENCE TO RELATED APPLICATIONS

This application is a National Stage of International Application No. PCT/JP2012/071144 filed Aug. 22, 2012, claiming priority based on Japanese Patent Application No. 2012-091285, filed Apr. 12, 2012, the contents of all of which are incorporated herein by reference in their entirety.

TECHNICAL FIELD

The present invention relates to an internal pouch held in a double-structured aerosol can that is capable of simultaneously ejecting a first agent and a second agent that compose an oxidizing hairdye. More specifically, the invention relates to an internal pouch having excellent barrier property, interlayer adhesiveness and shock resistance.

BACKGROUND OF THE INVENTION

There has heretofore been known a double-structured aerosol can containing, in a single aerosol container, a first agent containing a strongly alkaline component and a second agent comprising an acid component that compose an oxidizing hairdye in an attempt to eject these agents simultaneously.

As for the oxidizing hairdye contained in the double-structured aerosol can, the first agent comprises a dye and a strongly alkaline component which is chiefly an ammonia component. If the component in the first agent comes in contact with oxygen in the air during the storage, the first agent is chemically degenerated and its dyeing function decreases. If it continues to be in contact with oxygen, then the hair can no longer be dyed. Therefore, the internal pouch for containing the first agent must have a high degree of oxygen shut-off property (barrier property) and must also work to prevent the content from volatilizing out of the internal pouch and from extinguishing. Namely, the internal pouch must have a high gas shut-off function. It is also required to prevent the layer materials from being corroded or from being peeled off by the strongly alkaline component.

The second agent is an oxidizing acid component which chiefly comprises hydrogen peroxide. Therefore, the internal pouch must have a resistance against the pressure of internal expansion due to oxygen generated by the decomposition of hydrogen peroxide which is the oxidizing agent and must, further, work to prevent the content from volatilizing out of the internal pouch and from extinguishing. Further, the pouch must also be capable of preventing the layer materials from being corroded or from being peeled off like the internal pouch for the first agent.

As the internal pouches adapted to the first agent and the second agent of the oxidizing hairdye contained in the double-structured aerosol can, therefore, the present inventors have proposed the internal pouches held in the double-structured hairdye aerosol can in which the individual internal pouches were constituted by laminated layers of a metal foil and a thermoplastic resin or thermoplastic resin layers, and at least either one of the internal pouches was constituted by laminated layers of the metal foil and the thermoplastic resin (patent document 1).

PRIOR ART DOCUMENT

Patent document 1: Japanese patent No. 4332444

OUTLINE OF THE INVENTION

Problems that the Invention is to Solve

The internal pouches held in the above double-structured aerosol can have excellent properties being capable of storing the first agent and the second agent having different properties composing the oxidizing hairdye without permitting their properties to vary, without permitting the layers to be peeled off from each other or blistered (swollen). It was, however, learned that if they receive too large shocks such as of when they are fallen down, the layers may peel off from each other.

Usually, further, it has been recommended that the aerosol cans be not stored in an environment of temperatures of not less than 40° C. The above internal pouches are capable of maintaining excellent properties in an ordinary environment. It is, however, desired that the internal pouches are capable of maintaining excellent properties even in an environment of temperatures of as high as about 40° C. to provide safety.

It is, therefore, an object of the present invention to provide an internal pouch held in a double-structured aerosol can to contain a first agent and a second agent composing an oxidizing hairdye, the internal pouch effectively preventing the layers from being peeled off even in case it has received shocks such as of when it is fallen down.

Another object of the present invention is to provide an internal pouch capable of maintaining excellent properties even in an environment of relatively high temperatures.

Means for Solving the Problems

According to the present invention, there is provided an internal pouch held in a double-structured aerosol can, composed of a first internal pouch for containing a first agent and a second internal pouch for containing a second agent, the first agent containing a strongly alkaline component and the second agent comprising an acid component that compose an oxidizing hairdye, and the aerosol can being capable of simultaneously ejecting the first agent and the second agent; wherein the first internal pouch has a layer constitution that includes at least a polyolefin inner layer, an adhesive resin layer on the inner layer side, an aluminum foil, an adhesive resin layer on the outer layer side and a thermoplastic resin outer layer;

the second internal pouch has a layer constitution that includes at least a polyolefin inner layer, an adhesive resin layer on the inner layer side, an aluminum foil, an adhesive resin layer on the outer layer side and a thermoplastic resin outer layer; and the adhesive resin forming the adhesive resin layer on the inner layer side of the first internal pouch comprises a polyether type urethane resin.

In the internal pouch held in the double-structured aerosol can of the present invention, it is desired that:

1. The polyolefin inner layer of the first internal pouch and/or the second internal pouch comprises a linear low-density polyethylene;
2. The adhesive resin forming the adhesive resin layer on the inner layer side of the second internal pouch comprises a polyester type urethane resin;
3. An adhesive resin layer and a thermoplastic resin layer are further formed between the polyolefin inner layer and the adhesive resin layer on the inner layer side of the first internal pouch and/or the second internal pouch;
4. The thermoplastic resin layer of the first internal pouch comprises a polyamide resin; and
5. The thermoplastic resin layer of the second internal pouch comprises a polyester resin.

Effects of the Invention

The internal pouch of the present invention serves as a container for containing an oxidizing hairdye of the type of two agents, does not permit the hairdye contained therein to lose its dying function or does not permit the components contained therein to volatilize out of the internal pouch and, further, prevents the internal pouch from corroding, prevents the layers from being peeled off, effectively prevents the layers from blistering and, further, effectively prevents the layers from peeling off even in case the internal pouch has received shocks such as of when it is fallen down.

The first internal pouch and the second internal pouch of the invention are, respectively, filled with the first agent and the second agent which are composing the oxidizing hairdye in a single aerosol can. When ejected by being pressurized by a pressurized gas, the first agent and the second agent can be mixed together at a predetermined ratio.

The above effects of the invention will also become obvious from the results of Examples described later.

Figure 1:
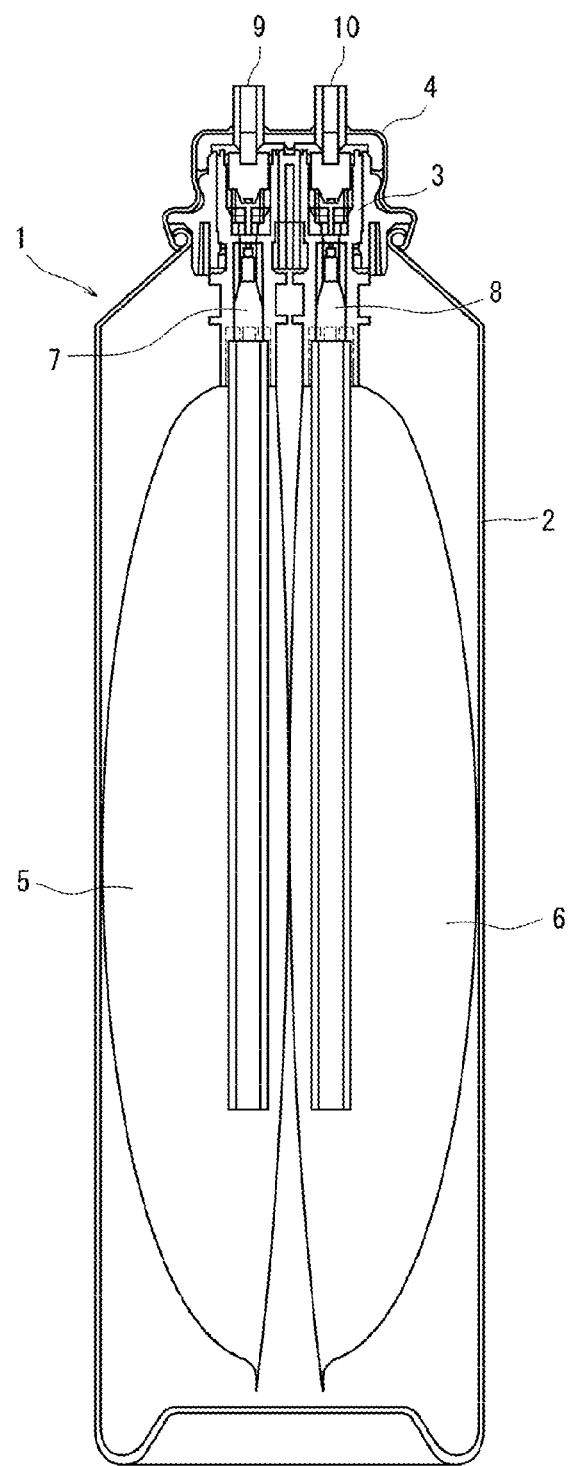
FIG. 1 is a sectional view schematically illustrating a double-structured aerosol can.
Figure 2A:
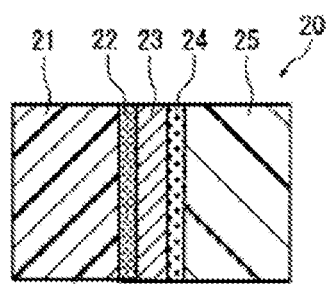
FIG. 2($a$) is a sectional view schematically illustrating the layer structure of the first internal pouch 20 including polyolefin inner layer 21, adhesive layer comprising polyether type urethane resin 22, aluminum foil 23, adhesive layer 24 and thermoplastic resin outer 25, whereas FIG. 2($b$) is a sectional view schematically illustrating the layer structure of the second internal pouch 30 including polyolefin inner layer 31, adhesive layer comprising polyester type urethane resin 32, aluminum foil 33, adhesive layer 34 and thermoplastic resin outer layer 35 in accordance with a first embodiment.
Figure 2B:
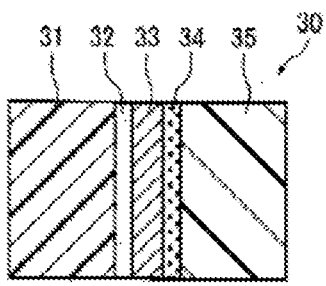
Figure 3A:
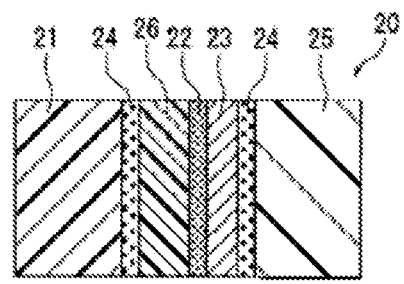
FIG. 3($a$) is a sectional view schematically illustrating the layer structure of the first internal pouch 20 including polyolefin inner layer 21, adhesive layer 24, polyamide resin layer 26, adhesive layer comprising polyether type urethane resin 22, aluminum foil 23, adhesive layer 24, and thermoplastic resin outer layer 25, whereas FIG. 3($b$) is a sectional view schematically illustrating the layer structure of the second internal pouch 30 including polyolefin inner layer 31, adhesive layer 34, polyester resin layer 36, adhesive layer comprising polyester type urethane resin 32, aluminum foil 33, adhesive layer 34 and thermoplastic resin outer layer 35 in accordance with a second embodiment.
Figure 3B:
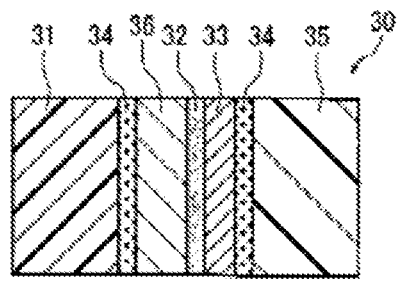

MODES FOR CARRYING OUT THE INVENTION (First Internal Pouch)

The first agent contained in the first internal pouch held in the double-structured aerosol can of the invention comprises, as described above, a dye and a strongly alkaline compound which is chiefly ammonia.

The internal pouch held in the double-structured aerosol can has heretofore been constituted, desirably, by using a polyolefin resin as an inner layer from the standpoint of moisture resistance and heat-sealing property, by using a metal foil such as aluminum foil as an intermediate layer for preventing the passage and volatilization of the first agent and the second agent that are contained, and, further, using a thermoplastic resin that forms the base material as the outer layer. In the present invention, too, the first internal pouch employs a basic constitution which includes a polyolefin inner layer, an adhesive resin layer on the inner layer side, an aluminum foil, an adhesive resin layer on the outer layer side and a thermoplastic resin outer layer.

The first agent of the oxidizing hairdye is contained in the internal pouch that has the above basic constitution. The polyolefin resin constituting the inner layer has a high gas permeability and the aluminum foil constituting the intermediate layer has a high gas shut-off property. Therefore, the strongly alkaline component permeates through the polyolefin inner layer but is shut off by the aluminum foil and stays in the adhesive resin layer positioned between the polyolefin inner layer and the aluminum foil layer. As a result, it is presumed that the adhesive resin is degenerated due to the strongly alkaline component, the strength of adhesion decreases, the layers peel off from each other, and hydrogen generates due to the reaction of the strongly alkaline component with aluminum giving rise to the occurrence of blistering.

In the conventional internal pouch, further, the layers have been laminated by the powder-coated lamination by using an acid-modified thermoplastic adhesive resin. At the time of adhesion, therefore, the powder adhered to the polyolefin inner layer must be heated and melted also causing the inner surface of the polyolefin to be temporarily melted. It is, therefore, considered that the polyolefin layer is crystallized in the step of cooling and becomes brittle losing shock resistance in case the internal pouch is fallen.

From the above point of view, an important feature according to the present invention resides in the use of a polyether type urethane resin as the adhesive resin on the inner layer side between the polyolefin inner layer and the aluminum foil layer of the first internal pouch, the polyether type urethane resin having specifically excellent resistance against alkalis and being capable of adhered by dry lamination. This realizes excellent interlayer adhesion and improved shock resistance.

The polyether type urethane resin is an urethane resin comprising an isocyanate component and a polyether polyol which is a polyol component. The present invention uses the adhesive resin which has heretofore been used. From the standpoint of resistance against alkalis, however, it is particularly desired to use the adhesive resin having a highly crosslinking density and, therefore, to use the one blended with the isocyanate compound in large amounts.

It is desired that the adhesive resin on the inner layer side is applied in an amount in a range of 2.0 to 6.0 g/m$^2$.

As the polyether type urethane resin having such a high crosslinking density, described below are concrete examples comprising the isocyanate component and the polyether polyol component.

As the isocyanate component, there can be exemplified aliphatic polyisocyanates such as 1,6-hexamethylene diisocyanate (HDI), 2,2,4-trimethylhexamethylene diisocyanate and lysine methyl ester diisocyanate; alicyclic polyisocyanates such as hydrogenated diphenylmethane diisocyanate, isophorone diisocyanate (IPDI) and hydrogenated tolylene diisocyanate; and aromatic polyisocyanates such as tolylene diisocyanate (TDI), 4,4'-diphenylmethane diisocyanate (MDI), naphthylene diisocyanate, xylene diisocyanate (XDI), triphenylmethane triisocyanate and tris(4-phenylisocyanate) thiophosphate, which may be used alone or being mixed in two or more kinds together, or which may be used being modified.

When it is attempted to increase the ratio of addition of the isocyanate component as the polyether type urethane resin to impart excellent resistance against alkalis, it is specifically desired to use aromatic polyisocyanates such as TDI and MDI.

As the polyether polyol component, there can be exemplified polyether polyols obtained by polymerizing the oxirane compound such as ethylene oxide, propylene oxide, butylene oxide or tetrahydrofurane by using, as an initiator, a low molecular polyol such as water, ethylene glycol, propylene glycol, trimethylolpropane or glycerine.

In the first internal pouch of the invention, the polyolefin inner layer is constituted by using an olefin resin such as low-density polyethylene (LDPE), medium-density polyethylene (MDPE), high-density polyethylene (HDPE), linear low-density polyethylene (LLDPE), linear very-low-density polyethylene (LVLDPE), isotactic or syndiotactic polypropylene (PP), ethylene-propylene copolymer, polybutene-1, ethylene-butene-1 copolymer, propylene-butene-1 copolymer or ethylene-propylene-butene-1 copolymer. Among them, however, the linear low-density polyethylene is favorably used specifically from the standpoint of shock resistance.

As the linear low-density polyethylene, there can be favorably used the one having a density in a range of 0.91 to 0.94 g/cm$^3$.

It is desired that the polyolefin inner layer has not been stretched from the standpoint of heat-sealing property.

As the thermoplastic resin outer layer, there can be used a thermoplastic resin that has heretofore been used as a base material for laminating layers of the packing containers, such as polyester resin, polyamide resin or olefin resin. To improve the resistance against the shocks of falling, however, it is desired to use a thermoplastic resin having excellent mechanical strength and, concretely, to use polyester resin such as polyethylene terephthalate or polybutylene terephthalate, or the polyamide resin such as nylon 6 or nylon 6,6. Among them, the polyethylene terephthalate, nylon 6 and nylon 6,6 can be favorably used. The thermoplastic resin outer layer may or may not have been stretched.

As the aluminum foil, there can be used the one that has heretofore been used for the packing materials such as the one provided on the surface thereof with a protection layer of a thermoplastic resin.

The adhesive resin on the outer layer side for adhering the thermoplastic resin outer layer and the aluminum foil together, is not affected by the strongly alkaline component unlike the adhesive resin on the inner layer side and, therefore, may be formed by using a known adhesive resin so far as it is capable of adhering the above thermoplastic resin and the aluminum foil together. Desirably, however, it is the urethane type adhesive like the adhesive resin on the inner layer side from the standpoint of lamination.

There is no specific limitation on the adhesive if it is the urethane type adhesive. It is allowable not only to use the above polyether type urethane resin but also to use the adhesive resin comprising a polyester type polyurethane resin obtained by using a polyester polyol as the polyol component. From the standpoint of productivity, it is desired to use the same adhesive resin as the one used for adhering the layers of the internal pouches.

The adhesive resin on the outer layer side is applied in an amount in a range of, desirably, 2.0 to 6.0 g/m$^2$.

As the polyester type polyurethane resin, there can be concretely exemplified polyester polyols obtained by reacting:

the isocyanate component used for the above polyether type polyurethane resin;

a dibasic acid such as terephthalic acid, isophthalic acid, adipic acid, azelaic acid or sebacic acid, or a dialkyl ester thereof, or a mixture thereof; and glycols such as ethylene glycol, propylene glycol, diethylene glycol, butylene glycol, neopentyl glycol, 1,6-hexane diol, 3-methyl-1,5-pentane diol, 3,3'-dimethylolheptane, polyoxyethylene glycol, polyoxypropylene glycol or polytetramethylene ether glycol or a mixture thereof; or there can be exemplified polyester polyols obtained by ring-opening-polymerizing lactones such as polycaprolactone, polyvalerolactone or poly(β-methyl-γ-valerolactone).

When the polyester polyol component and the isocyanate component are to be added, it is desired to increase the amount of the polyester polyol component. The isocyanate component is desirably the aliphatic one or the alicyclic one.

Any known method of adhesion can be suitably selected depending on the adhesive that is used. When the above urethane type adhesive resin is used, however, it is desired to use the dry lamination method that is capable of adhering the layers together efficiently and firmly without causing the polyolefin inner layer to become brittle.

In the first internal pouch, the layers in the basic structure have such thicknesses that the polyolefin inner layer is in a range of 20 to 200 μm and, specifically, 50 to 120 μm, that the aluminum foil is in a range of 5 to 15 μm, specifically, 7 to 12 μm, and that the thermoplastic resin outer layer is in a range of 10 to 25 μm.

Described below are examples of the preferred layer constitution of the first internal pouch though not limited thereto only.

(Inner layer) polyethylene/polyether type urethane adhesive resin/aluminum foil/polyether type urethane adhesive resin/polyethylene terephthalate (outer layer).

(Inner layer) polyethylene/polyether type urethane adhesive resin/aluminum foil/polyester type urethane adhesive resin/nylon (outer layer).

The first internal pouch may employ the above basic constitution which is, further, combined with other layers. In this case, it is desired that a layer of polyamide is formed as described below.

(Inner layer) polyethylene/polyether type urethane adhesive resin/nylon/polyether type urethane adhesive resin/aluminum foil/polyester type urethane adhesive resin/polyethylene terephthalate (outer layer).

Forming the polyester layer on the inside of the aluminum foil is not desirable since the polyester undergoes the hydrolysis.

(Second Internal Pouch)

The second agent is contained in the second internal pouch held in the double-structured aerosol can of the invention, and comprises an acid component which is chiefly hydrogen peroxide. In the second internal pouch, too, like in the above first internal pouch, it is considered that oxygen generated by the decomposition of hydrogen peroxide comes in contact with the aluminum foil to generate hydrogen which causes the blistering.

From the above point of view, the second internal pouch, too, employs the basic constitution of the polyolefin inner layer/adhesive resin layer on the inner layer side/aluminum foil/adhesive resin layer on the outer layer side/thermoplastic resin outer layer like the first internal pouch, and desirably uses, as the adhesive resin on the inner layer side, an adhesive resin which comprises a polyester type urethane resin having excellent resistance against acids. Further, the polyolefin inner layer and the thermoplastic resin outer layer may be the same as those of the first internal pouch, and are desirably laminated by dry lamination like those of the first internal pouch.

As means for improving the resistance of the polyester type polyurethane resin against acids, it is desired that the polyester polyol component is blended, or is reacted at the terminals thereof, with a polybasic acid.

As the polybasic acid, there can be exemplified phthalic acid, trimellitic acid, pyromellitic acid, succinic acid and maleic acid, as well as hydrides thereof, which are added in an amount of, desirably, about 0.1 to 20% by weight relative to the polyester polyol component.

As the adhesion promoter, further, there can be added a known silane coupling agent and an oxyacid of phosphorus together with the polybasic acid.

The adhesive resin on the inner layer side is applied in an amount, preferably, in a range of 2.0 to 6.0 g/m$^2$.

In the second internal pouch, the layers in the basic structure have such thicknesses that the polyolefin inner layer is in a range of 20 to 200 μm and, specifically, 50 to 120 μm, that the aluminum foil is in a range of 5 to 15 μm, specifically, 7 to 12 μm, and that the thermoplastic resin outer layer is in a range of 10 to 25 μm.

The second internal pouch, too, may employ the above basic constitution which is, further, combined with other layers. Specifically, it is desired to provide a layer of the above shock resistant thermoplastic resin between the polyolefin inner layer and the aluminum foil. By forming a polyethylene terephthalate as the shock resistant thermoplastic resin between the polyolefin inner layer and the aluminum foil, it is allowed to improve not only the shock resistance but also the resistance against acids. To improve the shock resistance, a layer of nylon may be formed on the inside of the aluminum foil. In this case, however, the nylon may be oxidized and deteriorated to become a cause of blistering.

There is no particular limitation on the resin that can be favorably used for adhering the polyolefin inner layer and the shock resistant thermoplastic resin layer together. From the standpoint of production efficiency, however, it is desired to use the same adhesive resin as the resin used for adhering other layers.

Described below are examples of the layer constitution of the second internal pouch though not limited thereto only.

(Inner layer) polyethylene/polyester type urethane adhesive resin/aluminum foil/polyester type urethane adhesive resin/polyethylene terephthalate (outer layer).

(Inner layer) polyethylene/polyester type urethane adhesive resin/polyethylene terephthalate/polyester type urethane adhesive resin/aluminum foil/polyester type urethane adhesive resin/polyethylene terephthalate (outer layer).

(Inner layer) polypropylene/polyester type urethane adhesive resin/polyethylene terephthalate/polyester type urethane adhesive resin/aluminum foil/polyester type urethane adhesive resin/polyethylene terephthalate (outer layer).

(Aerosol Can)

The double-structured aerosol can 1 of the invention holds the above-mentioned internal pouches therein. Referring to FIG. 1, though not limited thereto only, the double-structured aerosol can has a lid 4 attached thereto by caulking, the lid 4 having a content ejection mechanism 3 provided at the central opening thereof in the opening portion of the metal can 2. The metal can 2 holds therein the first internal pouch 5 filled with the first agent of the hairdye and the second internal pouch 6 filled with the second agent of the hairdye. These two kinds of agents can be simultaneously ejected by the pressurized gas such as nitrogen gas.

The two internal pouches are such that, as shown, the first internal pouch 5 is connected to a first passage 7 provided in the content ejection mechanism 3, and the second internal pouch 6 is connected to a second passage 8 provided in the content ejection mechanism 3, first passage 7 for the first agent and the second passage 8 for the second agent being so formed as will not come in contact with each other. The first agent passes through the first passage 7 while the second agent passes through the second passage 8. The first agent and the second agent are ejected up to the ends of a first stem 9 and a second stem 10 without being mixed together but being separated from each other.

Since the first and second internal pouches are held in one aerosol can, the two agents can be simultaneously ejected by the one-touch operation by using a fingertip of a consumer, and can be mixed together at a predetermined ratio. As the pressurized gas, the aerosol can contains an ordinary nitrogen gas, a carbon dioxide gas, a nitrous oxide gas or an argon gas in one kind or in a plurality of kinds.

It is also allowable to attach a comb or brush teeth to the ejection port of the aerosol can as a unitary structure, so that the hairdye that is ejected and mixed together is applied thereto and the hair is dyed as it is let down.

Described below are examples of the first agent comprising the dye and the strongly alkaline component which is chiefly ammonia and the second agent comprising the oxidizing acid component which is chiefly hydrogen peroxide, that are contained in the first and second internal pouches, though not limited thereto only.

The first agent comprising the strongly alkaline component, further, contains ammonia and intermediate products of oxidizing dye such as phenylene diamines or aminophenols, as well as a direct dye such as 4-nitro-o-phenylenediamine or 1,4-diaminoanthraquinone. If comes in contact with oxygen in the air during the storage, the components in the first agent are chemically degenerated and their dying function decreases, and become no longer capable of dying the air if they continue to be in contact with oxygen.

The second agent comprising the oxidizing acid component, further, contains hydrogen peroxide which is an oxidizing agent, a stabilizer such as phenancetin or EDTA and a pH-adjusting agent.

EXAMPLES

Preparation of the Internal Pouches

The laminated films of the layer constitutions shown in Tables 1 and 2 were prepared by the dry lamination method. In Tables, the first layers are on the outer side. Those having the seventh layers include a layer of a thermoplastic resin laminated on the inside of the aluminum foil between the aluminum foil and the polyolefin inner layer to improve shock resistance and resistance of the contents.

In Tables 1 and 2, "12PET" stands for a 12 μm-thick biaxially stretched polyethylene terephthalate film, "15NY" stands for a 15 μm-thick biaxially stretched nylon film, "9AL" stands for a 9 μm-thick aluminum foil, "60PP" stands for a 60 μm-thick unstretched polypropylene film, "60PE" stands for a 60 μm-thick polyethylene film unstretched linear low-density polyethylene film, and "100PE" stands for a 100 μm-thick unstretched linear low-density polyethylene film.

As for the adhesives among the layers, the ether type adhesive was the polyether type urethane resin adhesive and was applied in an amount of 3.0 g/m$^2$, the ester type adhesive was the polyester type urethane resin adhesive and was applied in an amount of 4.0 g/m$^2$, and the acid-resistant ester type adhesive was the polyester type urethane resin adhesive agent to which resistance against acids has been imparted and was applied in an amount of 4.0 g/m$^2$.

By using the thus formed laminated films, there were prepared the first internal pouches and the second internal pouches of a volume of 60 g.

TABLE 1

| No. | 1st layer | 2nd layer | 3rd layer | 4th layer | 5th layer | 6th layer | 7th layer |
|---|---|---|---|---|---|---|---|
| 1-1 | 12PET | ester type | 9AL | ester type | 60PE | | |
| 1-2 | 12PET | ester type | 9AL | ether type | 60PE | | |
| 1-3 | 12PET | ester type | 9AL | ether type | 60PP | | |
| 1-4 | 12PET | ester type | 9AL | ether type | 12PET | ether type | 60PE |
| 1-5 | 12PET | ester type | 9AL | ether type | 15NY | ether type | 60PE |
| 1-6 | 15NY | ester type | 9AL | ether type | 100PE | | |

TABLE 2

| No. | 1st layer | 2nd layer | 3rd layer | 4th layer | 5th layer | 6th layer | 7th layer |
|---|---|---|---|---|---|---|---|
| 2-1 | 12PET | ester type | 9AL | ether type | 60PE | | |
| 2-2 | 12PET | ester type | 9AL | ester type | 60PE | | |
| 2-3 | 12PET | ester type | 9AL | ester type | 60PP | | |
| 2-4 | 12PET | ester type | 9AL | acid-resistant ester | 60PE | | |
| 2-5 | 12PET | ester type | 9AL | acid-resistant ester | 15NY | acid-resistant ester | 60PE |
| 2-6 | 12PET | ester type | 9AL | acid-resistant ester | 12PET | acid-resistant ester | 60PE |
| 2-7 | 12PET | ester type | 9AL | acid-resistant ester | 12PET | acid-resistant ester | 60PP |

(Preparation of the Aerosol Can)

The first internal pouch and the second internal pouch in combinations shown in Table 3 were connected to the first passage 7 and to the second passage 8 of the content ejection mechanism 3 shown in FIG. 1, and were inserted in the metal can 2 after the interiors of the pouches were evacuated.

The lid 4 to which the content ejection mechanism 3 has been attached was fitted by caulking to the bead portion of the metal can 2 while filling nitrogen as the pressurized gas to a predetermined pressure (0.48 MPa).

Thereafter, the first agent and the second agent available in the market and for composing the hairdye were filled through the stems 9 and 10. The first agent possessed a pH of about 10 while the second agent possessed a pH of about 3.

(Storage Test)

The thus prepared aerosol cans were stored under the promoting conditions of an atmosphere of 45° C., evaluated as described below every after the passage of times of one-month period, two-month period and three-month period, and were described in the columns of Table 3 if they were defective together with the storage temperatures and the passage of time.

(Evaluating the Cans by Cutting Open)

After the passage of time under the predetermined conditions, the temperature was returned back to room temperature, and properties as products were measured, such as change in the weight, pressure, ejecting condition and pH values of the agents. Concerning these items, all of the samples proved to be lying in proper ranges.

Thereafter, the cans were cut open to make sure the peeling among the layers of the internal pouches and the occurrence of blistering.

(Falling Test)

After the passage of time under the predetermined conditions, the aerosol cans were stored at 5° C. for one day, and were caused to fall from a height of one meter three times in an upright attitude and another three times in a sideways attitude. Thereafter, the cans were cut open to make sure the conditions of the internal pouches.

(Evaluation)

The internal pouches were individually evaluated and marked with × if they were broken in the falling test or if their layers were peeled off. The individual pouches were, further, marked with × if they blistered in the one-month period, marked with Δ if they blistered in the two-month period without, however, any defect concerning other items, and were marked with ○ if they blistered in the three-month period without, however, any defect concerning other items. The internal pouches were marked with ⊚ if they were free of defect in all items that were evaluated.

Total evaluations of the aerosol cans were based on the poorly evaluated internal pouches.

TABLE 3

| No. | Pouch No. | | Broken (falling test) | Interlayer peeling | Blistering | Individual evaluation | Total evaluation |
|---|---|---|---|---|---|---|---|
| 1 | 1st agent | 1-1 | | | 45° C.-1M | X | X |
| | 2nd agent | 2-1 | | | 45° C.-1M | X | |
| 2 | 1st agent | 1-1 | | | 45° C.-1M | X | X |
| | 2nd agent | 2-2 | | | 45° C.-2M | Δ | |
| 3 | 1st agent | 1-2 | | | 45° C.-2M | Δ | Δ |
| | 2nd agent | 2-2 | | | 45° C.-2M | Δ | |
| 4 | 1st agent | 1-2 | | | 45° C.-2M | Δ | X |
| | 2nd agent | 2-3 | 45° C.-1M | | | X | |
| 5 | 1st agent | 1-3 | 45° C.-1M | | | X | X |
| | 2nd agent | 2-3 | 45° C.-1M | | | X | |
| 6 | 1st agent | 1-4 | | 45° C.-1M | | X | X |
| | 2nd agent | 2-4 | | | 45° C.-3M | ○ | |
| 7 | 1st agent | 1-4 | | 45° C.-1M | | X | X |
| | 2nd agent | 2-5 | | | 45° C.-1M | X | |
| 8 | 1st agent | 1-5 | | | | ⊚ | X |
| | 2nd agent | 2-5 | | | 45° C.-1M | X | |
| 9 | 1st agent | 1-5 | | | | ⊚ | ⊚ |
| | 2nd agent | 2-6 | | | | ⊚ | |
| 10 | 1st agent | 1-6 | | | 45° C.-3M | ○ | ○ |
| | 2nd agent | 2-7 | | | | ⊚ | |

(Consideration of the Results)

Concerning the first internal pouch, comparison of 1-1 with 1-2 tells that the polyether type urethane resin adhesive having excellent resistance against alkalis is suited as the adhesive resin on the inner layer side of the first internal pouch.

Comparison of 1-2 with 1-5 tells that the content shows improved resistance if the biaxially stretched nylon (polyamide resin) is added on the inside of the aluminum foil. In the case of 1-4, however, the content shows rather deteriorated resistance if the biaxially stretched polyethylene terephthalate (polyester resin) is added as the thermoplastic resin on the inside of the aluminum foil. This is presumably due to that the polyester resin is hydrolyzed with the strongly alkaline component that has permeated through.

Further, comparison of 1-2 with 1-6 tells that the content shows improved resistance if the polyolefin inner layer which is the innermost layer is thickened.

Concerning the second internal pouch, comparison of 2-1 with 2-2 tells that the polyester type urethane resin adhesive is suited as the adhesive resin on the inner layer side of the second internal pouch. Further, comparison of 2-2 with 2-4 tells that the polyester type urethane resin adhesive imparted with resistance against acids is more excellent.

Comparison of 2-4 with 2-6 tells that the content shows improved resistance if the biaxially stretched polyethylene terephthalate (polyester resin) is added on the inside of the aluminum foil. In the case of 2-5, however, the content shows rather deteriorated resistance if the biaxially stretched nylon (polyamide resin) is added as the thermoplastic resin on the inside of the aluminum foil. This is presumably due to that the polyamide resin is oxidized and deteriorated with the acid component that has permeated through.

Comparison of 1-2 with 1-3 and comparison of 2-2 with 2-3 tell that the linear low-density polyethylene is suited as the polyolefin inner layer which is the innermost layer, and that the polypropylene is inferior in regard to falling strength. In the case of 2-7, however, it is learned that the shock resistance improves if a suitable thermoplastic resin is added on the inside of the aluminum foil and that the polypropylene can be used as the polyolefin inner layer.

As for the total evaluation of the aerosol cans, No. 9 (first internal pouch 1-5, second internal pouch 2-6) is evaluated to be ◎ and No. 10 (first internal pouch 1-6, second internal pouch 2-7) is evaluated to be ○ in Table 3. From the results of evaluation of the individual internal pouches, however, it is considered that the total evaluation of ◎ could be attained if the first internal pouch 1-5 and the second internal pouch 2-7 are selected. It is, further, considered that the evaluation of ○ could be attained even with the combinations inclusive of the first internal pouch 1-6 and the second internal pouch 2-4.

The aerosol cans Nos. 9 and 10 that were totally evaluated to be ○ or ◎ in Table 3 were, further, similarly evaluated after the period of 40° C.-6 months to find the occurrence of no defect.

INDUSTRIAL APPLICABILITY

The first internal pouch and the second internal pouch held in the double-structured aerosol can of the present invention are capable of storing the first agent and the second agent having different properties and composing the oxidizing hairdye without permitting their properties to vary, without developing corrosion or blistering that may be caused by the contents, and without permitting the occurrence of interlayer peeling despite of receiving excess of shocks of falling or the like, and can, therefore, be favorably used for containing the oxidizing hairdyes of the type of two agents.

Further, the first internal pouch and the second internal pouch have excellent resistance against alkalis and acids and can, therefore, be favorably used for containing strongly alkaline contents and acidic contents in addition to containing the oxidizing hairdyes.

DESCRIPTION OF REFERENCE NUMERALS

1 double-structured aerosol can, 2 metal can, 3 content ejection mechanism, 4 lid, 5 first internal pouch, 6 second internal pouch, 7 first passage, 8 second passage, 9 first stem, 10 second stem.

The invention claimed is:

1. An internal pouch held in a double-structured aerosol can, composed of a first internal pouch for containing a first agent and a second internal pouch for containing a second agent, the first agent containing a strongly alkaline component and the second agent comprising an acid component that compose an oxidizing hairdye, and the aerosol can being capable of simultaneously ejecting the first agent and the second agent; wherein
   said first internal pouch has a layer constitution that includes at least a polyolefin inner layer, an adhesive resin layer, a polyamide layer, an adhesive resin layer on the inner layer side, an aluminum foil, an adhesive resin layer on the outer layer side and a thermoplastic resin outer layer;
   said second internal pouch has a layer constitution that includes at least a polyolefin inner layer, an adhesive resin layer, a polyester layer, an adhesive resin layer on the inner layer side, an aluminum foil, an adhesive resin layer on the outer layer side and a thermoplastic resin outer layer; and
   the adhesive resin forming the adhesive resin layer on the inner layer side of said first internal pouch comprises a polyether type urethane resin, and
   the adhesive resin forming the adhesive resin layer on the inner layer side of said second internal pouch comprises a polyester type urethane resin.

2. The internal pouch according to claim 1, wherein the polyolefin inner layer of said first internal pouch and/or said second internal pouch comprises a linear low-density polyethylene.

3. The internal pouch according to claim 1, wherein said thermoplastic resin layer of said first internal pouch comprises a polyamide resin.

4. The internal pouch according to claim 1, wherein said thermoplastic resin layer of said second internal pouch comprises a polyester resin.

* * * * *